United States Patent [19]
Fan

[11] Patent Number: 5,732,175
[45] Date of Patent: Mar. 24, 1998

[54] CONNECTING SYSTEM FOR FIBER OPTIC TERMINATION

[75] Inventor: Robert Jui-Lin Fan, Canoga Park, Calif.

[73] Assignee: LiteCom, Inc., Canoga Park, Calif.

[21] Appl. No.: 791,606

[22] Filed: Jan. 31, 1997

[51] Int. Cl.[6] .................................................. G02B 6/36
[52] U.S. Cl. ........................... 385/87; 385/66; 385/68; 385/80; 385/81; 385/84
[58] Field of Search .................................. 385/62, 66, 68, 385/79, 81, 84, 86, 87, 80

[56] References Cited

U.S. PATENT DOCUMENTS

| | | | |
|---|---|---|---|
| 4,140,366 | 2/1979 | Makuch et al. | 350/96.22 |
| 4,182,546 | 1/1980 | Lukas et al. | 350/96.21 |
| 4,444,461 | 4/1984 | Wey et al. | 350/96.21 |
| 4,799,759 | 1/1989 | Balyasny | 350/96.21 |
| 4,859,021 | 8/1989 | Wall | 350/96.2 |
| 5,097,525 | 3/1992 | Garcia et al. | 385/75 |
| 5,140,661 | 8/1992 | Kerek | 385/81 |
| 5,222,169 | 6/1993 | Chang et al. | 385/87 |
| 5,321,784 | 6/1994 | Cubukciyan et al. | 385/78 |
| 5,390,272 | 2/1995 | Rapta et al. | 385/87 |
| 5,425,119 | 6/1995 | Lee et al. | 385/86 |
| 5,611,012 | 3/1997 | Kuchenbecker | 385/86 |

Primary Examiner—John Ngo

[57] ABSTRACT

An improved connector mechanism having a connector coupling nut of a cylindrical tubular configuration with a bore extending therethrough. In one embodiment, the coupling nut has camming slots which align with bayonet pins on the mating adapter serving to draw the connector inwardly to the adapter upon rotation of the coupling nut. A detent window at the end of each camming slot engages and retains the bayonet pins driven slidingly along the camming slots during rotation. A resilient spring member provides stability between the end of the adapter and the internal bore of the coupling nut at the completion of the coupling operation. Variations of spring arrangements force the cylindrical fiber optic terminus, located axially centered within the coupling sleeve, forward to assure pressured abutment with a like mating terminus located opposite at the other end of the adapter. A cylindrical alignment element in the adapter having an internal bore accepts termini tips slidingly from both sides, radial forces provided by this tip assuring resistance force and stability of location of tips with the alignment bushing. A cable jacket/strength member termination at the rear of the terminus is affixed to the terminus in such manner as to be independent of any influence on the fiber/ terminus tip. In another embodiment, the connector has a threaded coupling mechanism. In yet another embodiment the transmission medium may be an electrically conducting metallic wire.

23 Claims, 12 Drawing Sheets

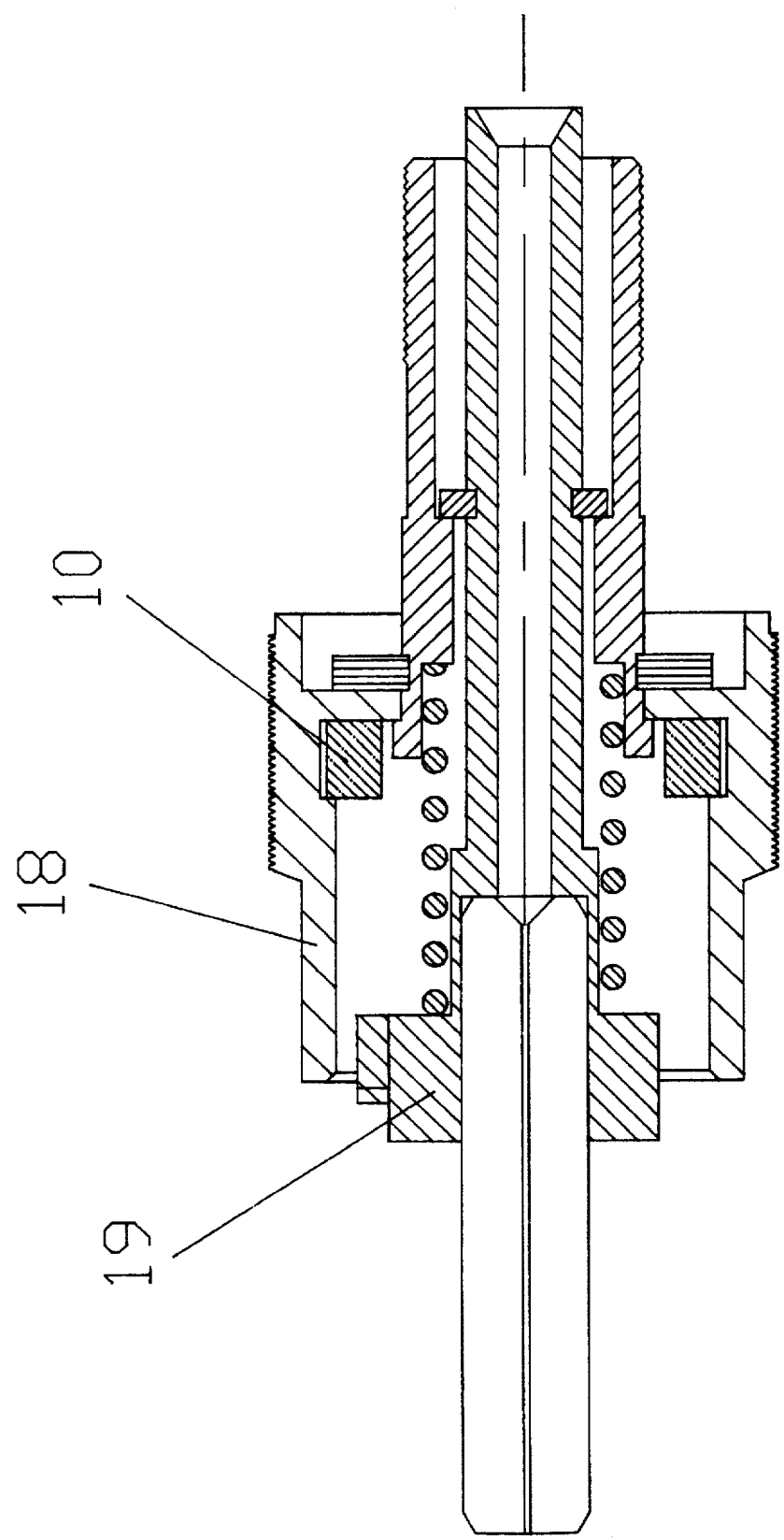

CONNECTING SYSTEM FOR FIBER OPTIC TERMINATION

FIELD OF THE INVENTION

This invention relates to the field of fiber optics in general and to connecting systems for fiber optics in particular.

BACKGROUND OF THE INVENTION

Connecting arrangements have been developed to precisely align optical fibers co-axially for continuous transmission of an optical signal. In any fiber optic connector, the two optical fibers to be aligned are positioned such that the axes of the two fibers are coincident as accurately as possible. This is important in any fiber optic connection, but especially with single mode optical fibers which have extremely small signal transmitting cores. Fibers are generally cemented with adhesive or otherwise bonded into each ferrule and the fiber ends are optically polished to minimize signal degradation from dispersive, reflective or refractive losses. Cable jacketing and strength members are generally affixed by cementing to a rear ferrule member as illustrated in U.S. Pat. No. 5,097,525. Alternatively, the cable jacketing and strength members may be affixed at the rear of the ferrule by crimping between 2 elements as described in U.S. Pat. No. 5,140,661.

Establishing the alignment of the optical fibers, ferrules are often used to protect and position the relatively small optical fiber. Precise ferrule tips are used having extremely accurate concentric positioning of the fiber relative to the outside diameter of the ferrule. Fiber-to-fiber alignment is thus achieved by aligning the two ferrules accurately with common central axes as seen in U.S. Pat. No. 4,799,759. However, under high mechanically induced shock and vibration, the aligned fibers are in jeopardy of becoming angularly, axially and longitudinally misaligned if the aligning mechanism yields even for small increments of time. Optical signal interruption or degradation for orders of 50-200 nanoseconds or more may cause serious optical signal system errors. Also, when vibration causes fiber ends to rapidly hammer each other, the fiber ends can become cracked or abraded to cause significant degradation in optical signal transmission. Stability in a fiber optic connector is of vital importance for the operation of the optical signal system.

In rigorous field applications of fiber optics, high temperature swings may be encountered. It is of utmost importance that proper selection of materials is accomplished to eliminate failures or degradation of terminus and connector materials in extreme low temperature or extreme high temperature situations.

Usage of fiber optic connectors includes coupling and uncoupling which must be uncomplicated for the user. There are occasions where initial installation may be in confined areas. The components, procedures and tools necessary to install the fiber optic termini must also be uncomplicated and yet reliable. Situations may require repair or replacement of fiber otic termini in difficult field conditions. Again, the procedures for installation must be simple to assure consistent reliable field terminations.

SUMMARY OF THE INVENTION

The optical fiber termination system of the present invention includes improvement over the prior art in the stability of a fiber optic connector pair. The invention includes overcoming the drawbacks of insufficient forces and inferior location of force application to assure fiber optic connector reliability in adverse field conditions. New design of terminations is shown.

In one embodiment of the invention, a compressible gasket is used to prevent a bayonet coupling cap from having an unsupported orientation relative to the connector coupling adapter. Strength and stability of the coupling mechanism is increased by using such a gasket feature by isolating movement between terminus and coupling adapter. The typical coil spring providing forward spring force is improved by using a series of curved washers or a plurality of coil springs to generate more force with less axial travel of the ferrule.

In another embodiment, the bayonet sleeve slots are covered with an external sleeve which results in a greater amount of surface area available for finger gripping. This also decreases the possibility of contamination entering the fiber optic terminus area with covered camming slots. In still another embodiment, the cable and strength members are terminated such that a controllable distance of fiber/tip is allowed independent of the cable jacket and strength member.

A mechanism which serves to lock the rear of the connector coupling apparatus from any rearward terminus/cable assembly motion is disclosed. This mechanism keeps the connector from being axially pulled rearwardly when a pull force on the cable is applied. In prior art, this rearward pull force results in a separation of the optical fibers at the connector interface if the rearward force exceeds the spring force of the terminus. The rear locking mechanism also provides a second point of maintaining axial alignment. In prior art, without this second point of axial alignment, it was possible, under mechanical applied forces, to displace the rear of the connector to one side or another which could cause angular misalignment at the fiber optic connector interface. A further feature of this rear mechanism is a spring-loaded ratcheting feature which prevents rotation of the threaded rear mechanism under adverse environmental and mechanical conditions.

In another embodiment, a threaded coupling mechanism is used rather than a bayonet coupling. Again, the rear mechanism to prevent axial displacement of the terminus/cable assembly may be used.

BRIEF DESCRIPTION OF THE DRAWINGS

FIG. 3B is sectional view of an embodiment which controls fiber movement by solid height compression of the coil spring.

DESCRIPTION OF THE PREFERRED EMBODIMENT

The present invention generally comprises an improved fiber optic connector. A salient feature of the invention in various forms is that the relative placement of components allows inexpensive, low tolerance, low cost fabrication of all but the precise fiber aligning tip and alignment member.

Figure 1:
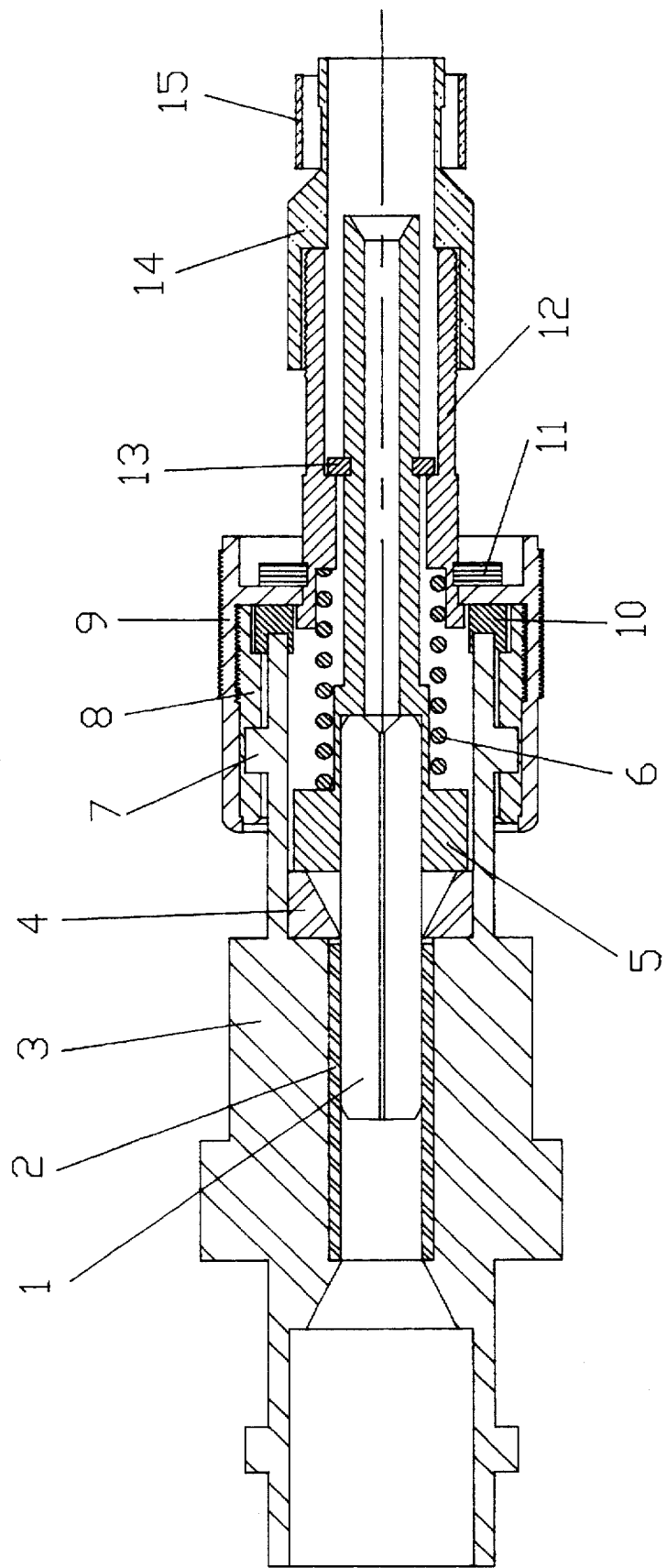
FIG. 1 is a sectional assembly view of the present invention showing two fiber optic connectors joined in a typical prior art alignment sleeve with crimp cable termination.

With regard to FIG. 1, the fiber optic connector generally is comprised of a fiber optic terminus connector which is mated to an adapter 3 having a precise alignment bushing 2 located by retainer 4 which receives the tip 1 of a connector from both sides effecting an aligning and joining of the two fiber optic connector halves. The connector terminus is comprised of the precise tip 1 preferably of ceramic material for precision of axial bore size and concentricity to the exceedingly smooth and straight tip exterior. The tip 1 may also be constructed of a wear-resistant metallic material, such as a stainless steel or it may be of any of several high grade molded or machined non-metallic plastic materials. The tip 1 is permanently affixed to terminus body 5 providing a protective inside diameter bore through which the optical fiber may pass and be affixed therein. Compression spring member 6 is slidingly placed over the rear of terminus body 5. Retaining ring 13 is radially compressed into an annular groove on the exterior of terminus body 5 to allow terminating ferrule 12 to be positioned slidingly over the rear of terminus body 5. A complete fiber optic cable consisting of buffered fiber, tensile strength members and protective outer fiber optic cable jacket is affixed to the connector with the unbuffered optical fiber portion slidingly placed within the bore of the tip 1, the buffered optical fiber portion simultaneously becoming located within the bore of terminus body 5, and the aramid, fiber glass or other strand-like strength member being directed over the rear exterior of terminating ferrule 12. Crimp ferrule 14 is positioned with the rear extension urged within the foremost portion of the fiber optic cable jacket prior to entry of the fiber optic cable into the connector terminus. As the fiber optic cable and crimp ferrule 14 are brought forward, the crimp ferrule 14 becomes abutted against the rear of terminating ferrule 12. Adhesive is placed within the rear of terminus body 5 to assure secure bonding, prior to entry of the fiber optic cable. Upon final location of fiber optic cable into the connector terminus, the exterior portion of crimp ferrule 14 is crimped inwardly, securely trapping the strength members between metallic surfaces on the exterior of terminating ferrule 12 and the interior of crimp ferrule 14. In similar fashion, the fiber optic cable jacket is securely trapped between the interior of crimp ring 15 and the exterior rear portion of crimp ferrule 14.

The fiber optic cable is thus secured into the connector terminus with adhesive on buffered and unbuffered fiber and with mechanical crimping of metallic members to firmly capture fiber optic cable strength member and jacketing.

A coupling mechanism attaches the connector terminus to the aligning adapter 3. Snap washer 11 affixes the coupling mechanism to the connector terminus by means of an external annular groove in the forward potion of terminating ferrule 12. Coupling sleeve 8 is press-fitted internal to bayonet sleeve 9 and has ramped grooves which are aligned with bayonet pins 7 by blindly rotating coupling sleeve 8 until the bayonet pins 7 simultaneously enter the ramped grooves. By continuing to rotate bayonet sleeve 9 and thus coupling sleeve 8, they are forced in a forward direction towards the connector adapter 3 by camming action of the bayonet pins 7 in the coupling sleeve 8 grooves. As this forward motion occurs, bayonet sleeve 9 which, again, is fixed by press-fit over coupling sleeve 8 is simultaneously urged forward bringing snap washer 11 forward as well. Snap washer 11 brings forward the connecter terminus and urges compressible gasket 10 against the end of adapter 3.

The compression force of spring member 6 urges tip 1 into the alignment bushing. In a complete fiber optic connection, an opposing connector half is located on the opposite side of adapter 3. When the second connector half is connected to adapter 3, the tip of the second connector half meets the tip of the first connector half prior to completion of the bayonet coupling mechanism rotation. Completion of the coupling sleeve rotation includes bayonet pins 7 being located within a detent portion located beyond the innermost portion of the camming ramps of coupling sleeve 8. When this condition is reached, the spring member 6 is applying compression on the shoulder of terminus body 5 and thus on tip 1 which assures compression of the two terminus tip 1 and 1' relative to one another. Simultaneously, compressible gasket 10 is urged against the end of adapter 3 assuring firm maintaining of bayonet pins 7 within coupling sleeve 8 final detent groove portions. Furthermore, any tensile loading upon the fiber optic cable cannot displace the optical fiber tip 1 in a rearward direction since the fiber optic cable is firmly attached to the coupling sleeve 8 which is locked against bayonet pins 7 of adapter 3 leaving the optical fiber locating connector terminus independent of cable tensile loading. At the time of fiber optic terminus tip 1 meeting the opposing tip 1', the tip 1 is forced back into the connector half while the coupling sleeve 8 is still being rotated and urged forward by camming slots over bayonet pins 7. The distance of this rearward fiber travel is controlled by fiber optic cable strip length dimensions and by spring member 6 and adjacent components. This limited relative motion of buffered fiber within fiber optic cable strength member and jacket is acceptable and actually provides safety in making provision for fiber movement within the fiber optic cable, a condition which typically can occur due to cable bending. Limit of fiber travel is provided by mechanical stop of the shoulder of terminus body 5 against the forward shoulder of terminating ferrule 12, or by selection of a coil spring which can go to solid height by design and stop rearward travel.

Figure 2:
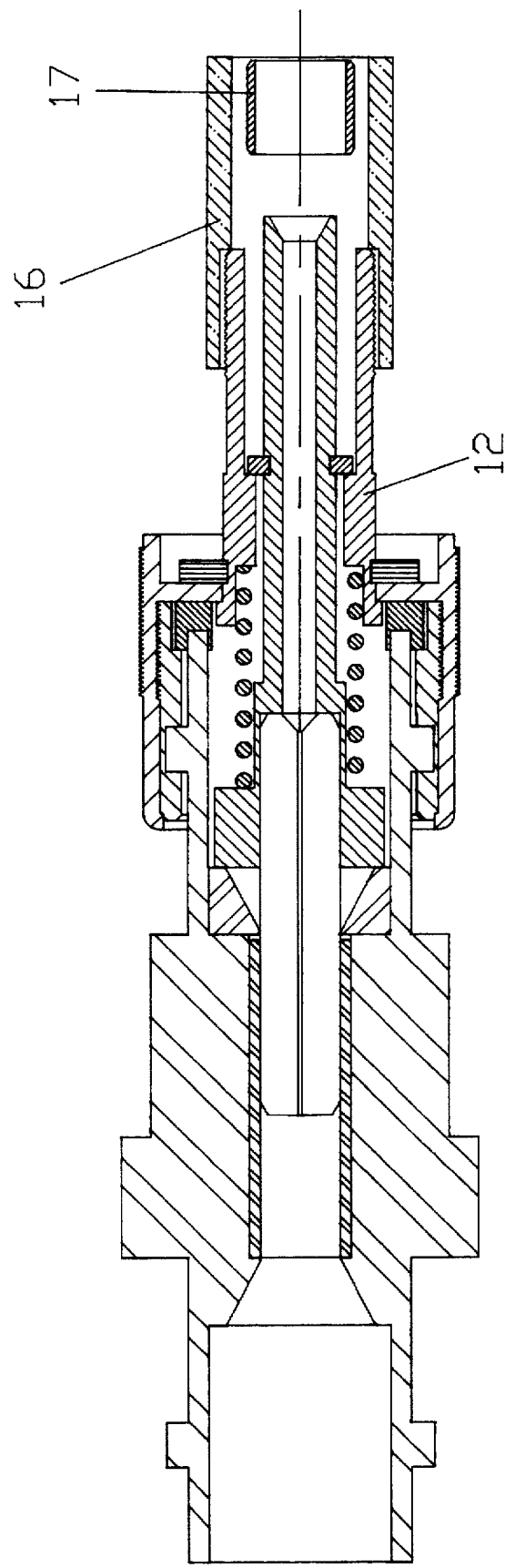
FIG. 2 is a sectional view of a connector emphasizing a compressible gasket maintaining force between the coupler adapter and the terminus coupling sleeve, with another crimp termination.

With regard to FIG. 2, the fiber optic connector half is shown in coupled condition. At the rear of the connector half, another embodiment of fiber optic cable termination is shown. Strength members are again located over the rear portion of terminating ferrule 12. Crimp sleeve 16 is simultaneously placed slidingly over the strength members and the rear portion of crimp ferrule 14, capturing strength members until crimp sleeve 16 is mechanically crimp-formed securely trapping the strength members. Crimp support 17 had been placed under fiber optic cable outer jacket providing a firm base of support when the rear portion of crimp sleeve 16 is mechanically crimp-formed over the cable jacket. The advantage of this arrangement is that the placement of crimp support 17 prior to entry of the prepared fiber optic cable allows a simple sliding forward of crimp sleeve 16, once the fiber optic cable is in place.

Figure 3:
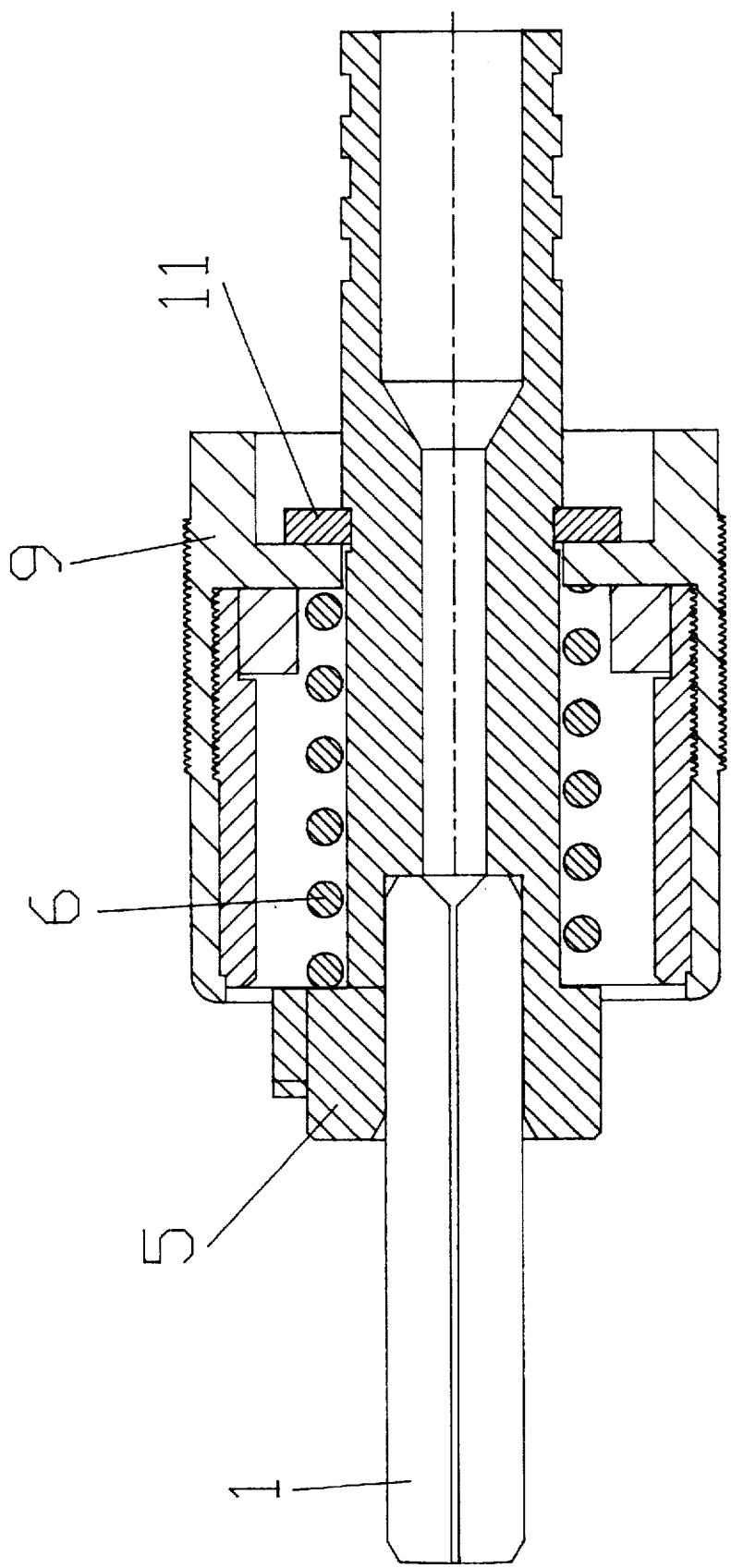
FIG. 3 is a sectional view of an embodiment of the fiber optic connector with a pre-loaded spring providing forward force on the terminus independent of the compressible gasket.

FIG. 3 illustrates the independent pre-loading of spring member 6 by capturing it compressively between the shoulder of terminus body 5 and the inner flange of bayonet sleeve 9, positioned by snap washer 11. A range of pre-determined amount of compression force of spring member 6 upon the connector half tip 1 may be established to meet variable requirements of the particular fiber optic connector application.

Figure 4:
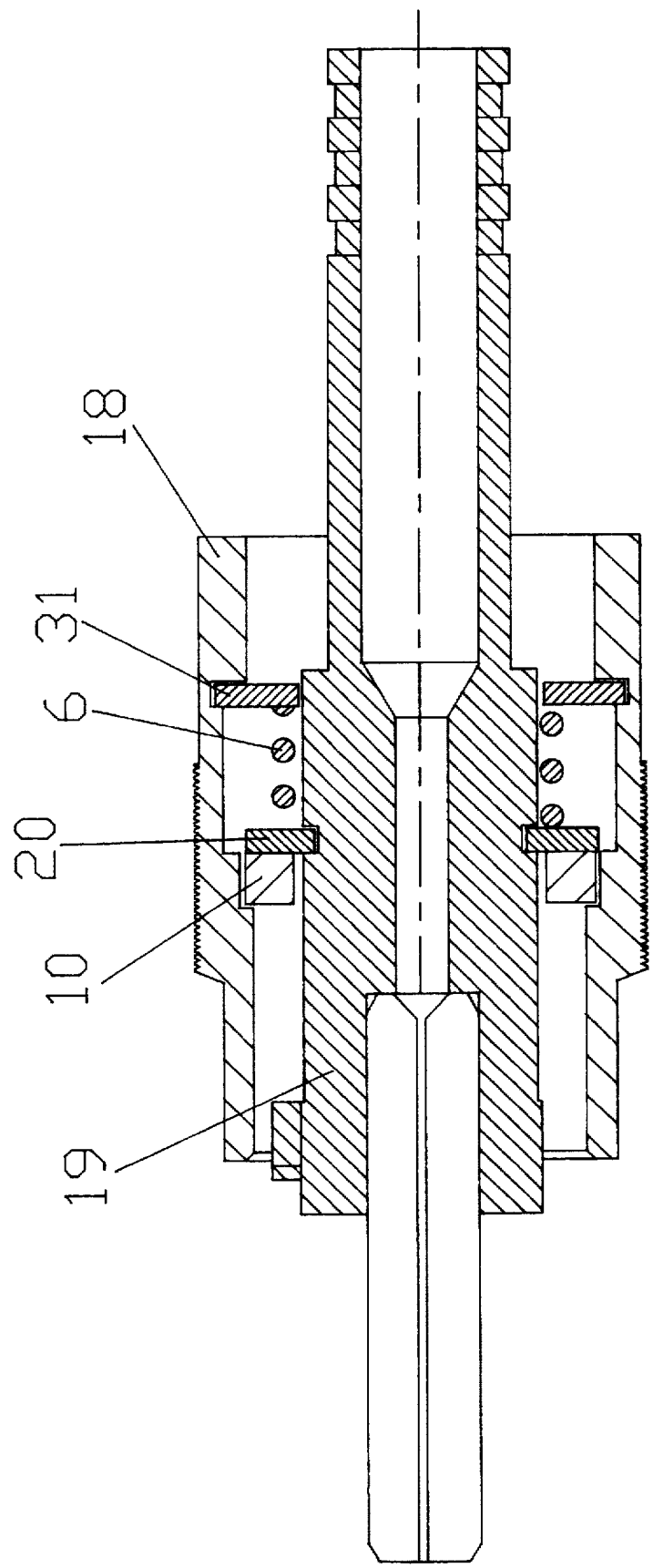
FIG. 4 is a sectional view of the fiber optic connector with terminus and compressible gasket in series.

FIG. 3B shows a configuration whereby the coil spring can be used by selection to provide a limited fiber travel rearward with solid height condition of the compressed coil spring. It also shows a protruding entry of the rear of the terminus body, useful for easily introducing adhesive. FIG. 4 shows an embodiment where spring member 6 and compressible gasket 10 are configured in series. In this arrangement, force is applied through rotation of coupling sleeve 18 which forces the terminus body 19 slidingly forward through washer 31 acting upon spring member 6 acting upon snap washer 20 located in an external groove of terminus body 19. Simultaneously, compressible gasket 10 is forced slidingly forward against the end of adapter 3 through coupling sleeve 18 acting upon washer 31 which acts upon spring member 6 which in turn acts upon snap washer 20.

Figure 5:
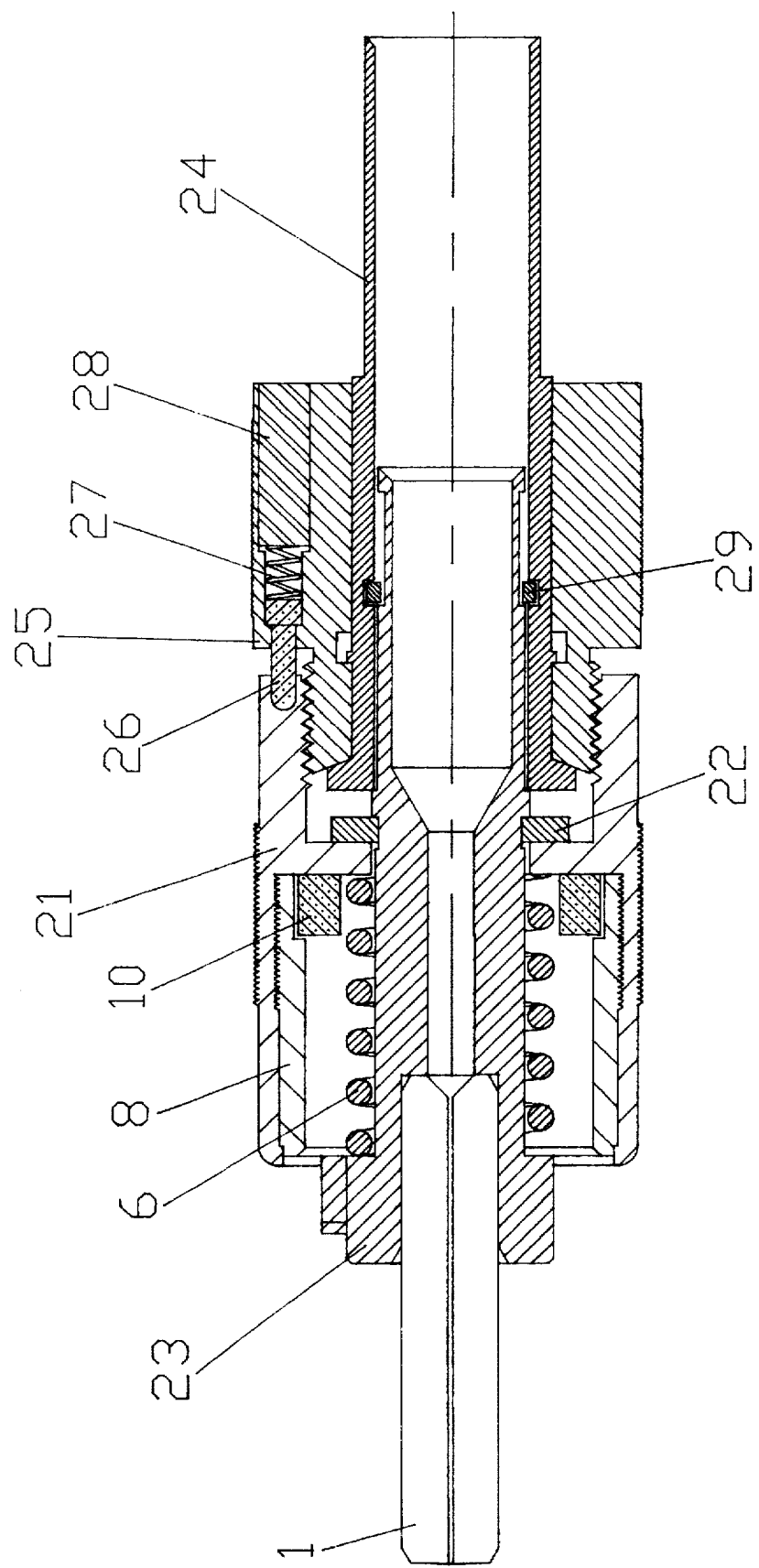
FIG. 5 is a sectional view of a protective rear cap which prevents any rearward motion of the ferrule.

An embodiment which has an additional feature to assure that rearward tensile force applied to the fiber optic cable does not affect the tip 1 to tip 1' spring-loaded mated condition, is shown in FIG. 5. Here, spring 6 is pre-loaded with compression force applied to tip 1 through the shoulder of terminus body 23, the other end of spring 6 being confined by an internal flange of bayonet sleeve 21 acting against snap washer 22, confined to an external groove of terminus body 23. Fiber optic cable attachment is entirely within the rear opening of terminus body 23 and rear ferrule 24. Attachment may be by adhesive, crimping or a combination of adhesive and crimping. At this point, tensile loading on the terminated fiber optic cable will cause retracting of tip 1 away from the fiber optic interface whenever the force applied in a direction away from the tip 1 exceeds the spring force of spring member 6. In order to prevent such retracting of tip 1, an arrangement whereby rearward movement is prevented has been shown in FIG. 5. This arrangement consists of a threaded protective cap 25 which is attached to the rear of bayonet sleeve 21 by means of internal threads at the rear of bayonet sleeve 21. A rear ferrule 24 is forced forward by the leading internal edge of protective cap 25, which acts upon a retaining ring 29 affixed to rear ferrule 24 in an internal groove. The rear ferrule 24 in turn acts upon terminus body 23 though retaining ring 29 by means of an external groove in terminus body 23. Simultaneously or independently, the front shoulder of rear ferrule 24 acts upon an external annular ridge of terminus body 23. Thus, when this arrangement is in place, the terminus body 23 and tip 1 cannot move rearward in relation to bayonet pins 7 of adapter 3 because of solid location of the series of features from bayonet sleeve 21 and coupling sleeve 8 through the protective cap 25 relationship to the terminus tip 1 as described. In order to assure no relative retracting of protective cap 25 due to vibrational or other induced rotation relative to bayonet sleeve 21, a locking feature is disclosed as seen in FIG. 5. This locking feature consists of detent pin 26 located in one of a plurality of indentations at the rear-facing edge of the protective cap 21. The detent pin 26 is spring-loaded by compression spring 27, compressed by set screw 28 in a threaded opening at the rear of protective cap 25. The set screw 28 may have a self-locking feature to prevent rotational back-off in the event of vibrational or other mechanically induced forces. When the connector half is to be uncoupled, the protective cap 25 arrangement may be removed by rotational un-threading, the force required to accomplish this being applied by a technician which is a greater force than the resistance provided by the set screw in the indentations at the rear edge of protective cap 21. Alternatively, the set screw may be retracted prior to the removal of the protective cap 25. The elongated external groove on terminus body 23 allows the protective cap 25 and rear ferrule 24 to be moved rearwardly as the unthreading process of removal takes place, yet assures that the protective cap 2B arrangement will not become separated from the connector half.

Figure 6:
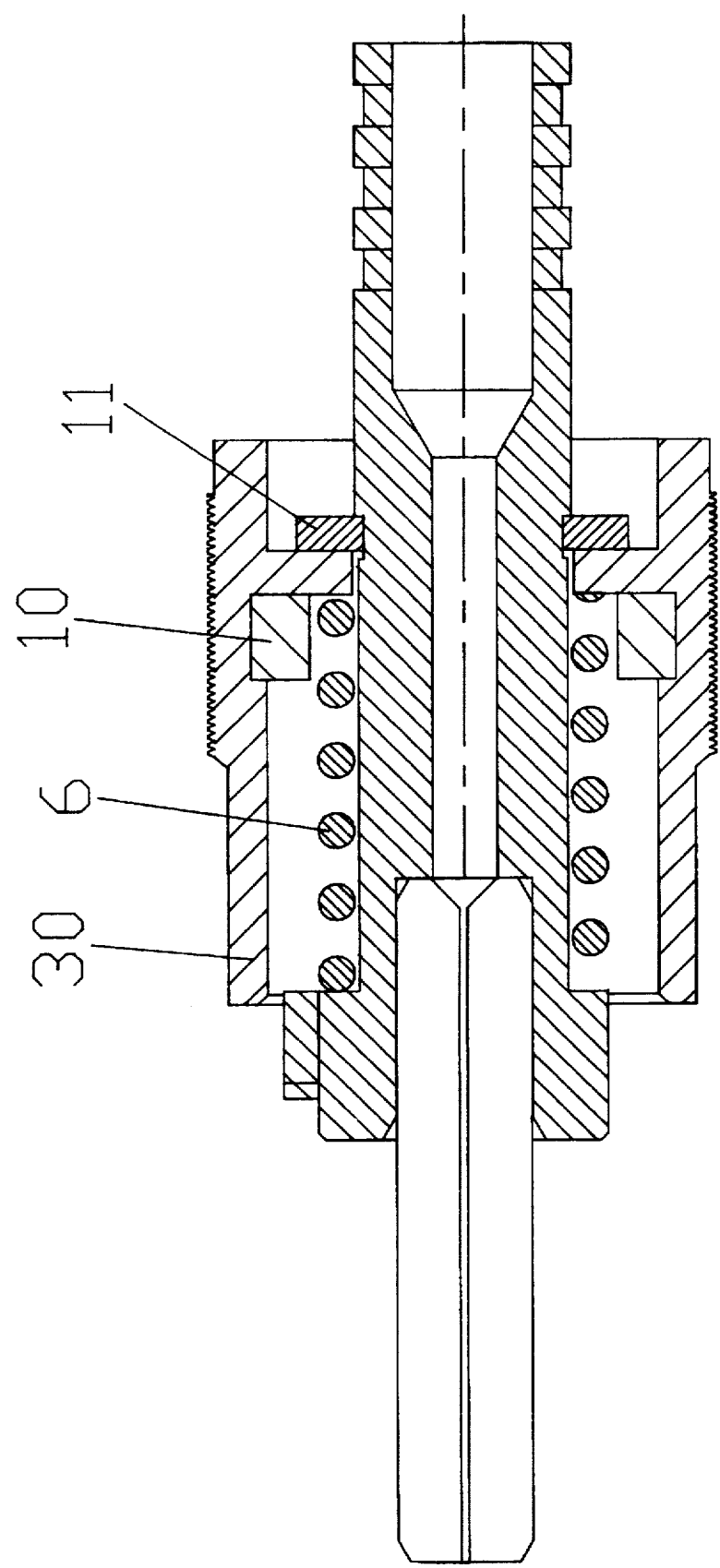
FIG. 6 is a sectional view of a typical prior art coupling sleeve with no protective cover.

In FIG. 6, an alternative embodiment is shown which has a coupling sleeve 30 which has open grooves as in prior art. However, this coupling sleeve has features internal to it which position compressible gasket 10, spring member 6 and snap washer 11.

Figure 7:
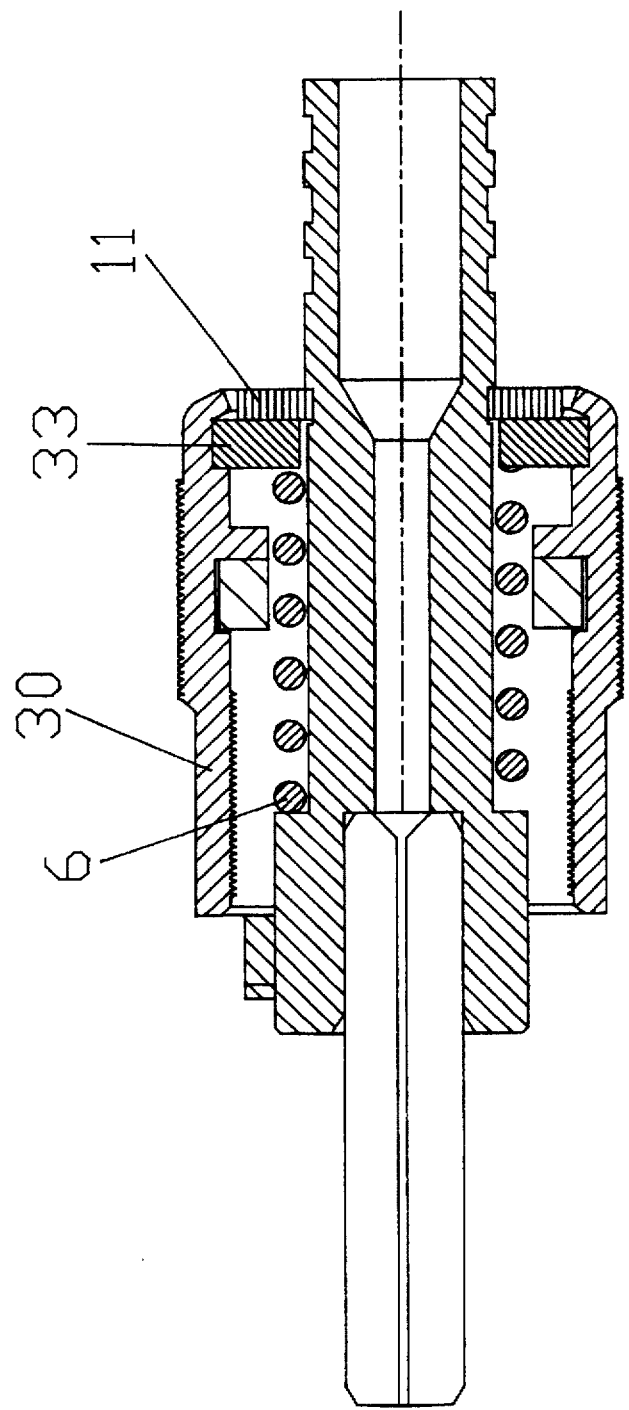
FIG. 7 is a sectional view of a threaded coupling embodiment of this invention.

FIG. 7 illustrates an alternative method of manufacture in which a retaining ring 33 is used to position the coupling sleeve 30 relative to the fiber optic terminus. The spring member 6 provides rearward force against retaining ring 33 which is captured by rollover of the rearmost portion of the periphery of coupling sleeve 30. Snap washer 11 prevents retaining ring 33 and thus coupling sleeve 30 from rearward motion relative to the fiber optic terminus. The coupling mechanism of FIG. 7 is a threaded coupling rather than bayonet coupling.

Figure 8:
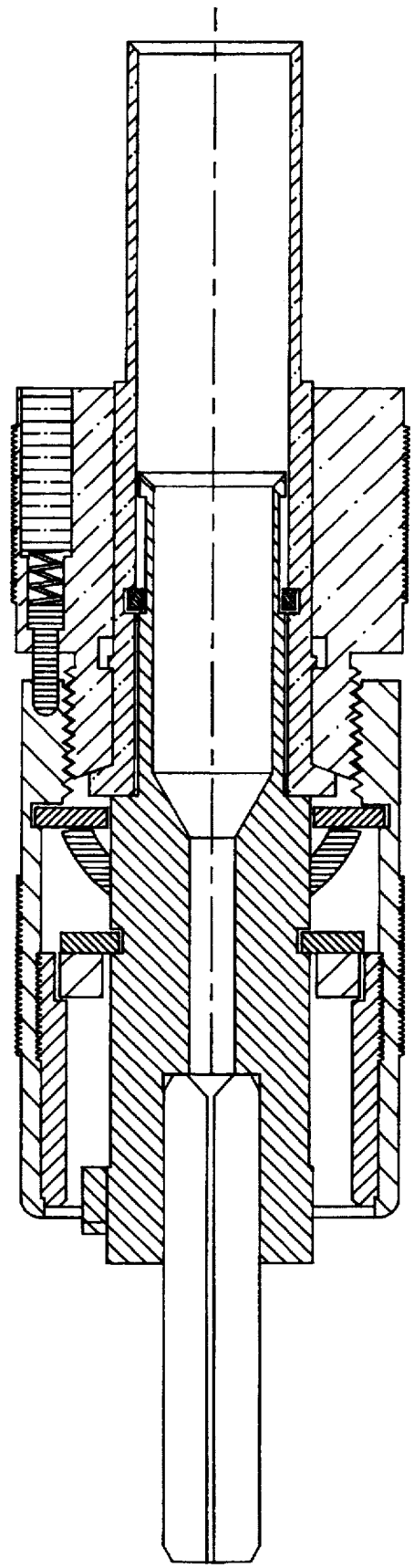
FIG. 8 is a sectional view of a threaded coupling embodiment of this invention with the locking protective cap at the rear.

FIG. 8 shows the threaded coupling mechanism with a protective cap apparatus at the rear which will prevent rearward motion of the fiber optic connector terminus when rearward tensile forces are applied to the terminated optical fiber cable.

Figure 9:
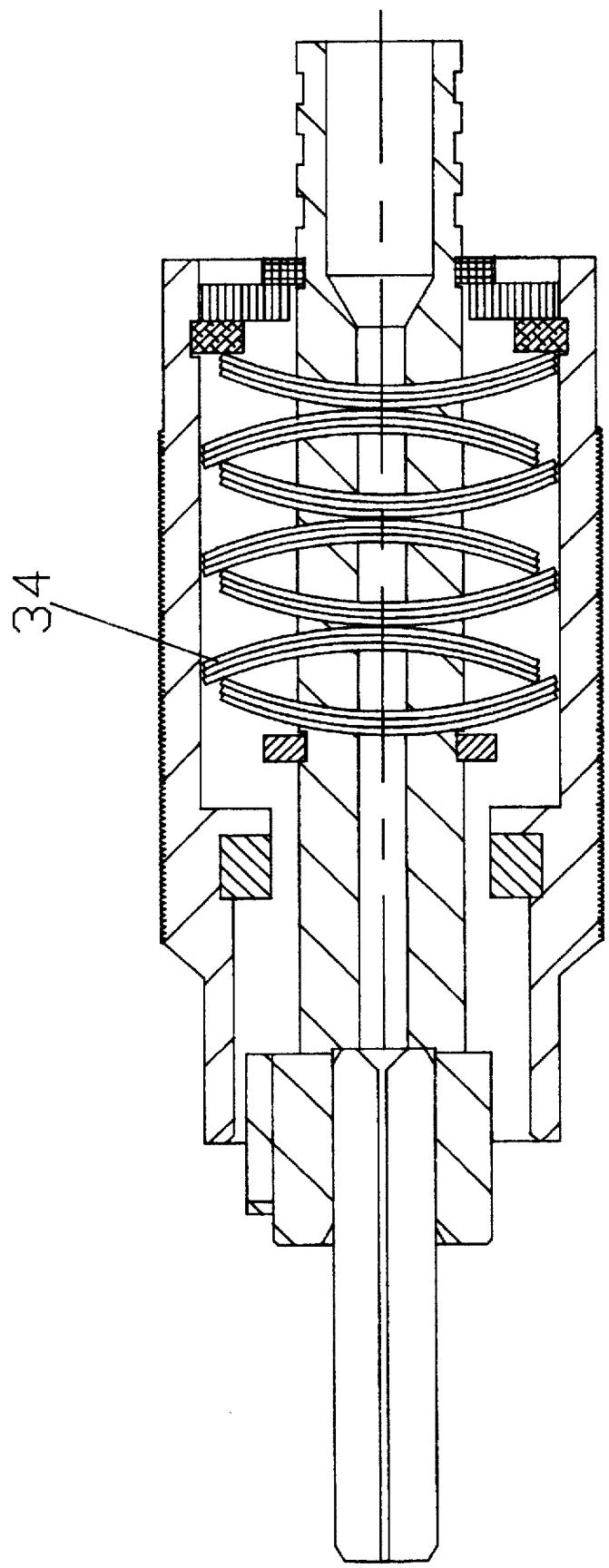
FIG. 9 is a view of the present invention with a plurality of curved washers as a spring force member.

Use of optional spring members of a curved washer (34) configuration is seen in FIG. 9. Here, a series of curved washers 34 takes up the space of the spring member and variations of numbers of curved washers may be employed. Since the force of each set of curved washers 34 is the total force of the series, it is the variation of the number of washers in a set which changes the force applied. In FIG. 9 there are 3 washers shown in each set of curved washers 34.

Figure 10:
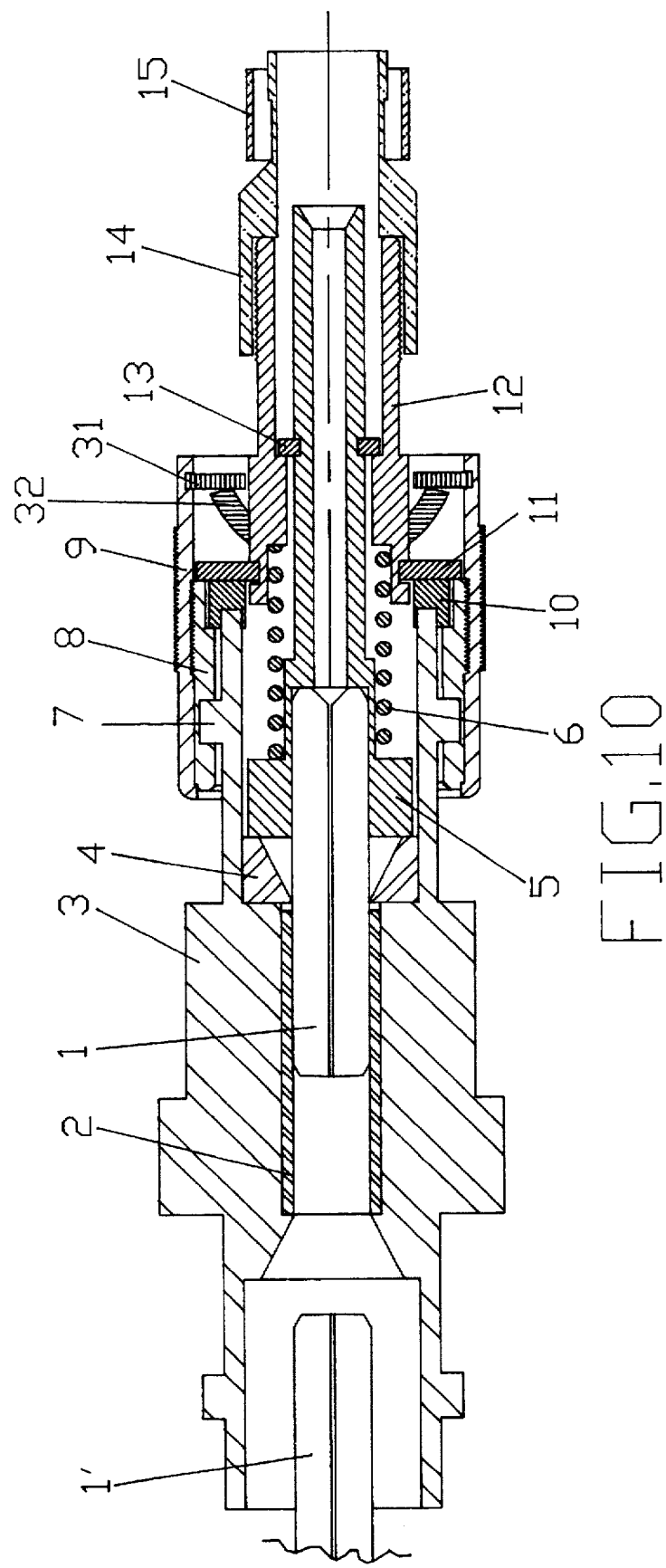
FIG. 10 is a sectional view of the present invention having a curved washer spring member to provide resisting force in the coupling sleeve forward motion.

FIG. 10 is an alternative configuration similar to FIG. 1 wherein an independent spring washer 32 is used to provide additional rearward force of the bayonet coupling sleeve 9 against bayonet pins 7 in the coupled connector condition. The description of FIG. 1, regarding terminus tip 1 in relation to mating terminus tip 1' and fiber optic cable termination at the rear of the fiber optic connector terminus, applies to FIG. 10.

Figure 11:
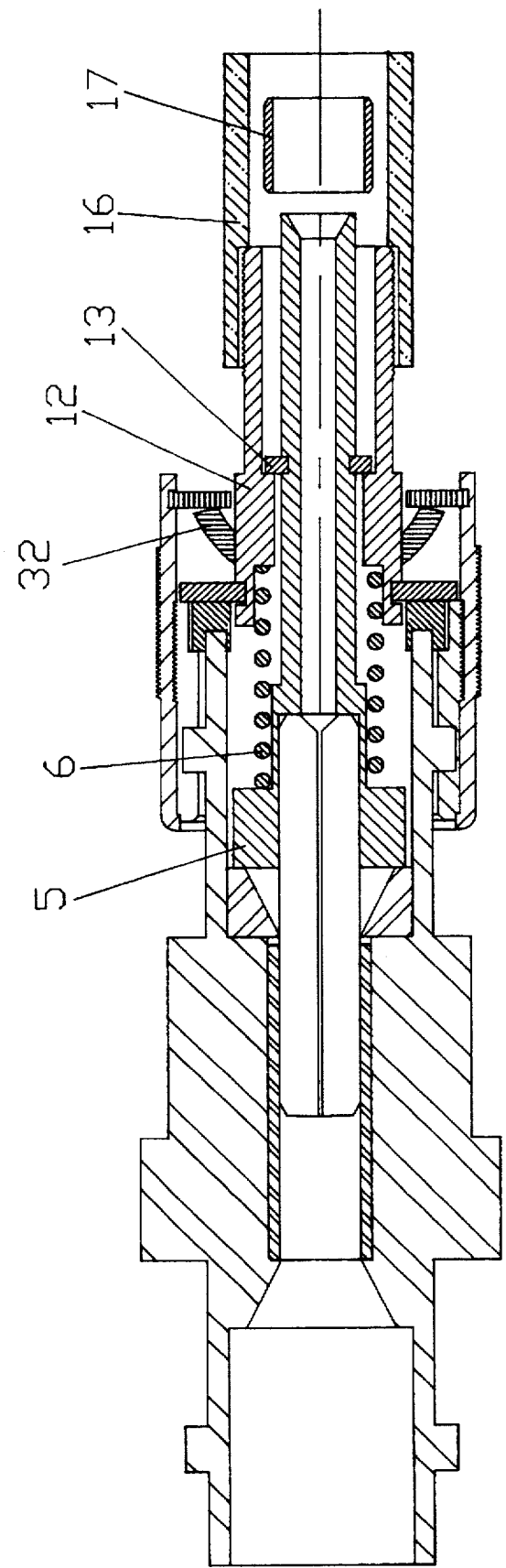
FIG. 11 is a sectional view similar to FIG. 10 with an alternative cable strength member capturing apparatus.

Similarly, FIG. 11 shows an alternative configuration to FIG. 2 wherein the independent spring washer 32 is also used to provide additional rearward force to the bayonet coupling sleeve 9 against bayonet pins 7 in the coupled connector condition. Also, the description of FIG. 2 applies regarding tip-to-tip relative mating condition and fiber optic cable termination at the rear of the fiber optic connector terminus seen in FIG. 11.

Even though the connector assembly described herein has been applied to optical fiber applications useful to both single mode and multimode optical fiber/cable, it should be noted that the mechanism of cable capture, the spring-loading arrangements and coupling mechanisms may also be adapted for use with electrical applications or with fluid or gas connections. In such applications, the optical fiber terminated in each connector assembly could be replaced by electrical wiring with pin and socket contact tips or with tubular members in the case of fluids or gasses.

What is claimed is:

1. An optical transmission connecting device for optical signal or optical power passage through fiber an optical fiber cable typically having one or a plurality of optical fibers with a glass or plastic core, a glass or plastic cladding over said core, a buffer coating and/or tubing over said cladding, strength member and outer protective jacket over said fiber, buffer coat(s) tubing, and strength members comprising;

an optical fiber terminus consisting of a hollow crimpable or adhesive-accepting ferrule having an entrance bore diameter larger than said optical fiber cable jacket, a reduced bore diameter portion larger than said optical fiber buffer coat and a further reduced exit bore tip having an inside diameter approximately equal to said optical fiber consisting of core and cladding whereby said optical fiber is passed therethrough;

a coupling sleeve having a bayonet style coupling mechanism which serves to attach said optical fiber terminus to an adapter having an opening at each end with a tapered entry inlet accepting said fiber-containing ferrule and having a precision alignment sleeve which maintains a close-fitting relationship to said optical fiber terminus exit bore tip, bayonet pins of said adapter guided by matching ramping grooves in said coupling mechanism coupling sleeve;

means for providing a compressive spring force between said adapter and the optical fiber terminus providing significant stability, said bayonet style coupling mechanism providing camming action serving to overcome firm resilient resistance of said compressive spring force by means of said bayonet pins during coupling operation;

means for providing a compressive coil spring force between said coupling mechanism and said optical fiber containing ferrule independent of said coupling mechanism-to-adaptor spring force;

means of terminating said optical fiber cable portions through which tensile loading forces are applied independent of said optical fiber terminus ferrule in which said signal or power transmitting optical fiber is fixed, said tensile forces being transferred to said adapter through said bayonet pins engaging with said bayonet coupling sleeve means of limiting rearward travel of said optical fiber ferrule which could result in optical fiber axial movement during operation of said coupling mechanism.

2. The optical signal or power transmission device of claim 1 in which said optical transmission means is an optical fiber waveguide of hollow construction.

3. The optical signal or power transmission device of claim 1 in which said coupling mechanism is threaded.

4. The optical signal or power transmission device of claim 1 in which said coupling mechanism is breech-coupled.

5. The optical signal or power transmission device of claim 1 in which said compressive spring force between said coupling mechanism and said optical fiber locating ferrule is provided by resilient material.

6. The optical signal or power transmission device of claim 5 in which said compressive spring force is provided by curved spring washers.

7. The optical signal or power transmission device of claim 1 in which said limitation of rearward ferrule and fiber movement is provided by a solid height compressed orientation of the coil spring.

8. The optical signal or power transmission device of claim 7 wherein said spring member is resilient material compressed to a reduced height.

9. The optical signal or power transmission device of claim 7 wherein said spring member is a curved spring washer or a plurality of curved spring washers which deflect in compression to a solid height condition.

10. The optical signal or power transmission device of claim 1 in which said optical fiber cable is terminated at the rear of said connector using mechanical crimping means over an outer crimp sleeve having a tubular support member located within said cable jacket and said tensile strength member, the optical signal or power transmitting fiber passing there through.

11. The optical signal or power transmission device of claim 10 in which said crimping is applied to a crimp sleeve having an inside diameter larger than said cable jacket and said tensile strength member which are passed there through while a tubular extension portion of said optical fiber locating ferrule has a smaller outside diameter than the inside diameter of said optical fiber cable jacketing whereby said ferrule tubular extension is placed within said cable jacketing and strength member while said crimp sleeve is crimped over said optical fiber cable exterior.

12. The optical signal or power transmission device of claim 1 in which said compressive spring force member which provides compressive force between said adapter and said optical fiber terminus is a resilient compressible material of variable hardness and thickness.

13. The optical signal or power transmission device of claim 12 in which said compressive spring force is a metallic element having axially compressive spring properties whereby compressive forces applied are less than sufficient to exceed the elastic limit of said metallic element.

14. The optical signal or power transmission device of claim 1 in which said compressive force between said adapter and said optical fiber terminus is in series with said compressive force between said coupling mechanism and said optical fiber locating ferrule.

15. The optical signal or power transmission device of claim 1 having a device added to the rear of said coupling sleeve which provides a mechanical stop preventing rearward travel of said optical fiber locating ferrule.

16. The device of claim 15 having a spring-loaded plunger acting against any one of a series of indentations preventing unintentional reverse of the coupling mechanism.

17. The optical signal or power transmission device of claim 1 having an adapter with variable outward flared entry configuration to accommodate various size optical fiber terminus tips.

18. The optical signal or power transmission device of claim 1 a close-fitting precision alignment sleeve acting upon said terminus tips with variable radial forces allowing variation of longitudinal entry and mating forces.

19. The optical signal or power transmission device of claim 1 used to connect electrical wires through a pin and socket arrangement in place of said optical fiber tips and alignment sleeve arrangement.

20. The optical signal or power transmission device of claim 1 used to connect hollow fluid carrying lines with an arrangement of conical-tip tubes and having a compatible double-ended tapered entry element in said adapter.

21. The optical signal or power transmission device of claim 1 having said bayonet coupling ramping grooves open or uncovered radially exposing bayonet coupling pins.

22. The optical signal or power transmission device of claim 1 having said bayonet coupling ramping grooves covered by means of a tubular outer sleeve to eliminate entry of contamination.

23. The optical signal or power transmission device of claim 1 having no compressible resilient member between said coupling sleeve and said adapter, but having a coil spring which may be compressed to solid height as a stop between said optical fiber locating ferrule and said coupling mechanism.

* * * * *